United States Patent
Lambert et al.

[11] Patent Number: 6,112,987
[45] Date of Patent: Sep. 5, 2000

[54] METHOD OF EXECUTING A TRANSACTION ON A SMARTCARD, A SMARTCARD AND A TRANSACTION PROCESSING SYSTEM INCLUDING A SMARTCARD

[75] Inventors: Howard Shelton Lambert, Southampton; James Ronald Lewis Orchard, Winchester, both of United Kingdom

[73] Assignee: International Business Machines Corp., Armonk, N.Y.

[21] Appl. No.: 09/095,866

[22] Filed: Jun. 11, 1998

[30] Foreign Application Priority Data

Jul. 26, 1997 [GB] United Kingdom .................. 9715744

[51] Int. Cl.[7] .............................. G06K 5/00; G06K 17/60
[52] U.S. Cl. .................. 235/380; 235/379; 235/385; 902/25; 902/26; 902/27; 705/14
[58] Field of Search ...................... 235/380, 379, 235/385; 902/25, 26, 27; 705/14

[56] References Cited

U.S. PATENT DOCUMENTS

| | | | |
|---|---|---|---|
| 4,766,293 | 8/1988 | Boston | 235/379 |
| 5,097,115 | 3/1992 | Ogasawara et al. | 235/380 |
| 5,483,048 | 1/1996 | Kobayashi | 235/380 |
| 5,532,463 | 7/1996 | Debelleix et al. | 235/380 |
| 5,585,787 | 12/1996 | Wallerstein | 340/825.34 |
| 5,649,118 | 7/1997 | Carlisle et al. | 395/241 |
| 5,705,798 | 1/1998 | Tarbox | 235/379 |
| 5,767,504 | 6/1998 | Menconi | 235/492 |
| 5,777,903 | 7/1998 | Piosenka et al. | 364/700 |
| 5,806,045 | 9/1998 | Biorge et al. | 705/14 |
| 5,828,053 | 10/1998 | Kinugasa | 235/492 |
| 5,914,471 | 6/1999 | Van De Pavert | 235/380 |

FOREIGN PATENT DOCUMENTS

| | | |
|---|---|---|
| 0618534 | 10/1994 | European Pat. Off. . |
| 0657813 | 6/1995 | European Pat. Off. . |
| WO96/36947 | 11/1996 | WIPO . |

*Primary Examiner*—Donald Hajec
*Assistant Examiner*—Douglas X. Rodriguez
*Attorney, Agent, or Firm*—Louis P. Herzberg; Fitch, Even, Tabin & Flannery

[57] ABSTRACT

A method of executing a transaction on a smartcard of the type including a processor, a memory for storing a system program, an application programs and for storing data and an interface enabling communication with an external processor in a local terminal adapted to access related data is disclosed. The method comprises the steps of: determining from the data stored on the smartcard in a pre-transaction state if the transaction can be executed validly by the smartcard (102); determining from the related data stored in a pre-transaction state and accessible by said external processor if the transaction can be executed validly by the external processor (102); in response to said determining steps being affirmative, executing said transaction on said smartcard and by said external processor (105); and in response to said smartcard or said external processor failing to execute said transaction, restoring said data and said related data to the or each pre-transaction state (108).

24 Claims, 2 Drawing Sheets

METHOD OF EXECUTING A TRANSACTION ON A SMARTCARD, A SMARTCARD AND A TRANSACTION PROCESSING SYSTEM INCLUDING A SMARTCARD

FIELD OF THE INVENTION

The present invention relates to a method for transaction processing on a smartcard.

BACKGROUND OF THE INVENTION

Smartcards are known which include a processor, a memory for storing a system program, an application program and for storing data and an interface enabling communication with an external processor in a local terminal adapted to access related data.

Smartcards are more frequently becoming used to initiate commercial transactions. Control of such transactions needs to achieve reliable updating of both the data stored on the smartcard as well as the related data stored in the local terminal unit or a remote server.

An example of such transaction processing relates to a smartcard for a retail store storing an accumulated loyalty points total. In this case, the store will also wish to retain a central database of customer loyalty points. It is therefore critical that both the smartcard and central database are updated with any loyalty point transactions. In the event of error, neither the smartcard nor the database should be updated and either the customer and operator are advised accordingly; or the system retries the transaction.

Another example of such transaction processing relates to smartcards for storing accumulated air miles, although it will be seen that the problems relating to smartcard transaction processing are not limited to any particular commercial field.

DISCLOSURE OF THE INVENTION

Accordingly, the present invention provides a method of executing a transaction on a smartcard of the above type comprising the steps of:
   determining from the data stored on the smartcard in a pre-transaction state if the transaction can be executed validly by the smartcard;
   determining from the related data stored in a pre-transaction state and accessible by said external processor if the transaction can be executed validly by the external processor;
   in response to said determining steps being affirmative, executing said transaction on said smartcard and by said external processor; and
   in response to said smartcard or said external processor failing to execute said transaction, restoring said data and said related data to the or each pre-transaction state.

Preferably, the method includes the steps of:
   before said determining steps, creating a stream of references to objects which update data in the transaction, and when said transaction is complete, removing said references from said stream.

Preferably, said stream of references includes a reference to an object stored on said smartcard for updating the data stored on the smartcard and a reference to an object for updating the related data accessible by said external processor.

Preferably, said determining steps are carried out for each reference in the stream, said executing steps are carried out for each reference in the stream and, if necessary, said restoring steps are carried out for each reference in the stream.

Preferably, the method includes the step of, in response to one of said determining steps being negative, instructing said smartcard and said external processor not to execute said transaction.

Preferably, said determining steps are carried out in parallel.

Preferably, the execution of said transaction on said smartcard and by said external processor is carried out in parallel.

Preferably, said step of determining from the data stored on the smartcard if the transaction can be validly executed includes the step of storing said pre-transaction state of said data and storing a post-transaction state of said data and, in response to said smartcard or said external processor failing to execute said transaction, destroying said stored post-transaction state of said data.

The invention further provides a smartcard of the above type wherein said memory includes update means adapted to determine if a transaction can be executed validly by the smartcard; and commit means to execute said transaction.

The invention further provides a transaction processing system including a smartcard according to the present invention inter-operable with a terminal, said terminal including update means adapted to determine if the transaction can be executed validly by the terminal; and commit means to execute said transaction.

Preferably, said memory includes means for storing the pre-transaction state of said data, and rollback means for restoring said data to said pre-transaction state in response to any of said commit means failing to execute said transaction.

Preferably, said terminal includes rollback means for restoring said related data to said pre-transaction state in response to either of said commit means failing to execute said transaction.

Preferably, said related data is stored in said external unit. Alternatively, said related data is stored in a remote server and said terminal is adapted to communicate with said server to determine if said transaction can be executed and to execute said transaction.

DESCRIPTION OF THE PREFERRED EMBODIMENT

The present embodiment implements a transaction processing system according to the invention in a Java environment. A Java virtual machine runs on a terminal, and a smartcard includes a class Card_upd which extends a class Base_upd resident on the terminal. It will be seen, however, that with recent improvements in smartcard technology, it is possible to have a separate Java environment running on the smartcard and communicating with the terminal environment. Thus, the Card_upd methods can execute in their own Java environment or within the terminal Java environment.

The embodiment is described with reference to a terminal running a till program which processes a customers loyalty points stored on a smartcard. The customer accumulates loyalty points on the smartcard through making purchases and a copy of the total number of points is stored on a central server connected via a communications link to a plurality of such till terminals. The customer may at some stage wish to redeem some loyalty points against a purchase at which time the total number of points stored in the smartcard and the central server must be updated accordingly.

When a user wishes to redeem loyalty points, a Till program invokes a Till_Rules applet which determines whether it is possible for the end-user to make a purchase by redeeming the loyalty points. The Till_Rules applet operates in a conventional manner by reading the points from the smartcard, calculating the monetary value of the points and comparing this with the purchase amount. If this is possible a Loyalty applet is invoked to control the transaction.

The Loyalty applet instantiates a Lserver_upd class and Card_upd class. The Lserver_upd class also extends Base_upd class. Base_upd includes Base_upd_constructor, an object having a constructor method, which when Lserver_upd and Card_upd are instantiated, adds a reference to these classes (objects) to an upd_obj_stream, step 100.

Figure 1:
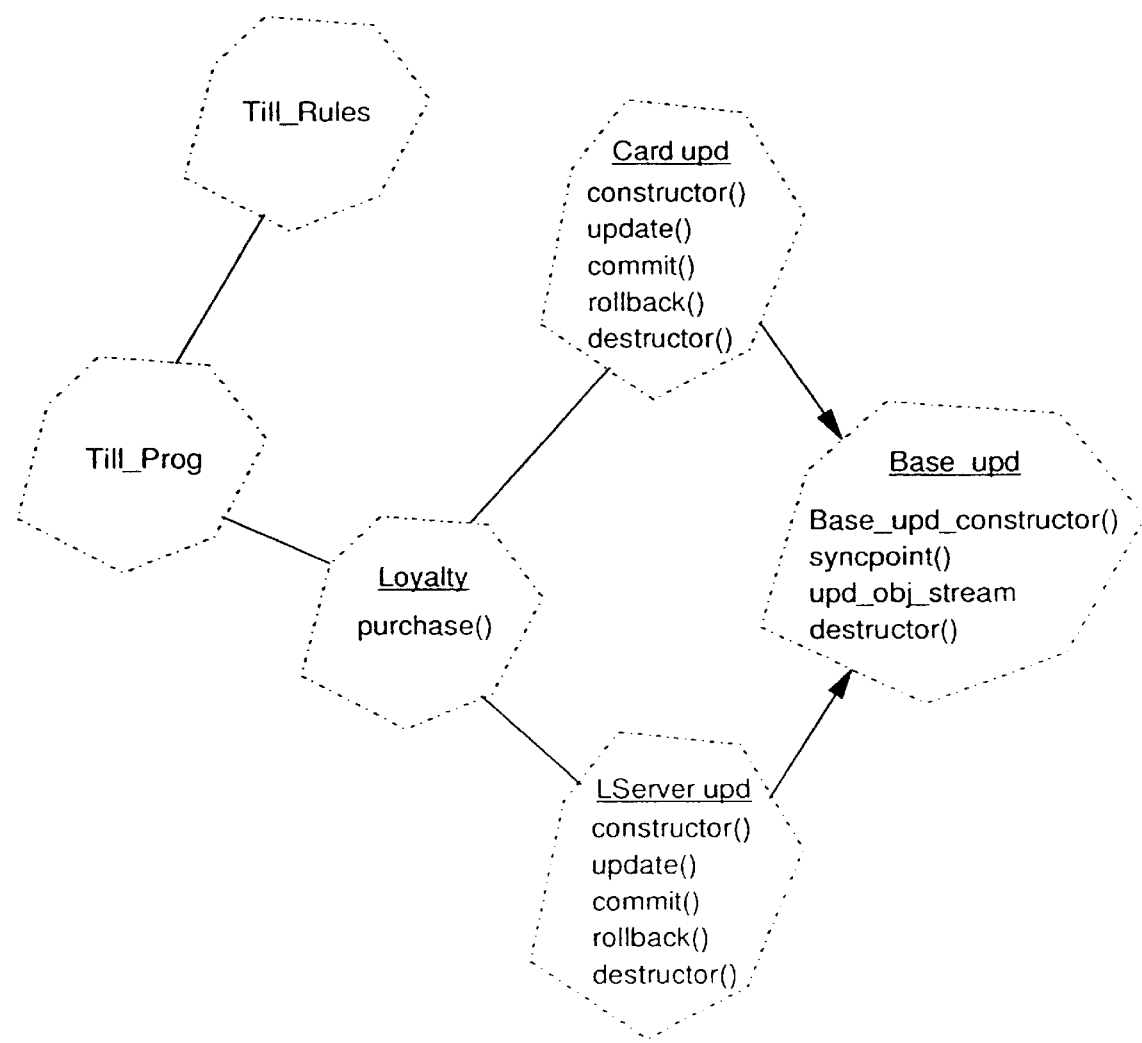
FIG. 1 is a class diagram for a smartcard transaction method according to the present invention.
Figure 2:
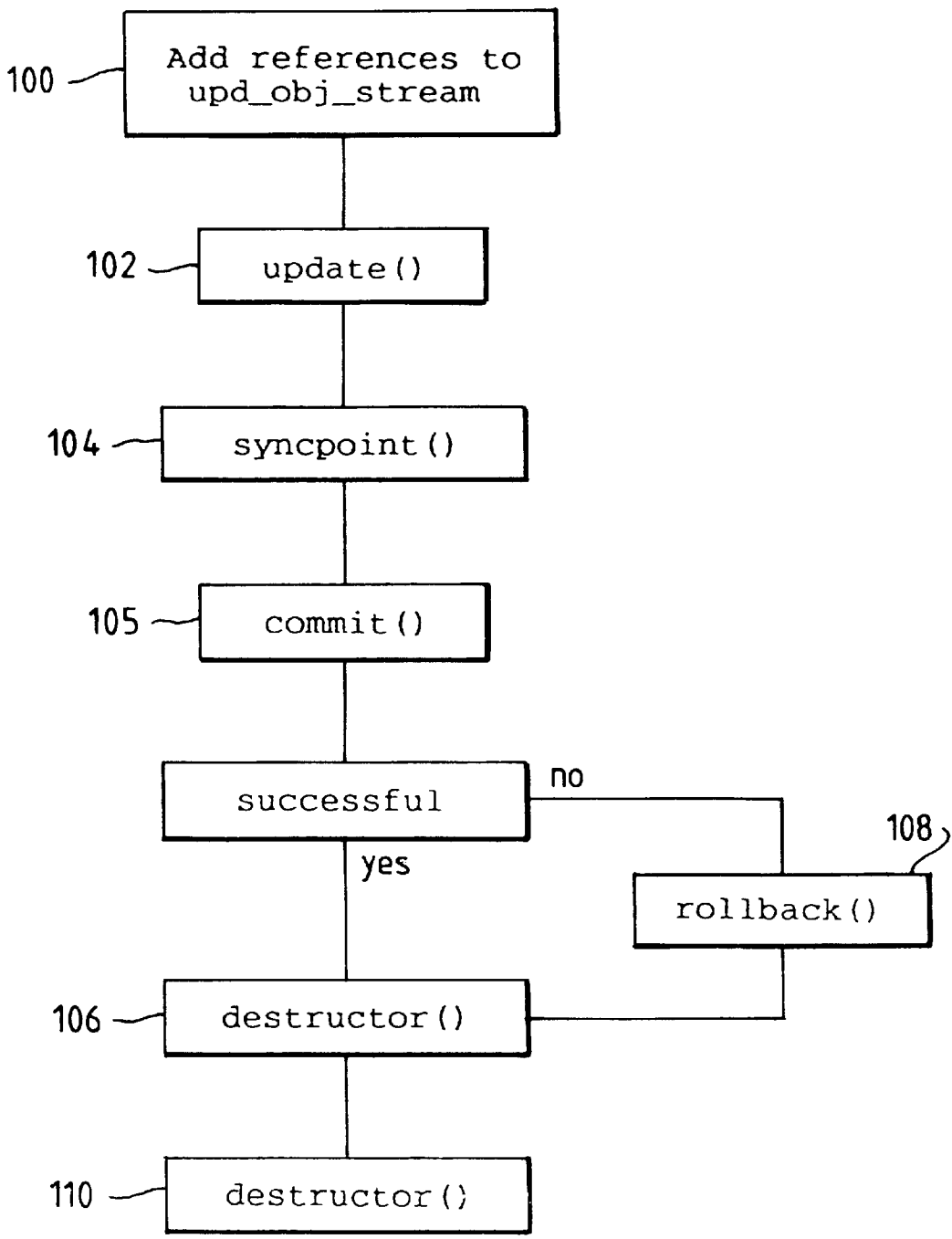
FIG. 2 is a flow diagram for a smartcard transaction method according to the present invention.

Turning now to FIG. 2, once the references to the classes are added the upd_obj_stream at step 100, then for each reference in the stream, the Loyalty applet calls an update() method, step 102. Each update method 'caches' the update without performing a 'write-thru' to the loyalty points total stored on the smartcard and the corresponding data stored on the central server. In caching, the update methods store both a pre-transaction state of the loyalty points total, and a post-transaction state of the loyalty points total in volatile or non-volatile memory.

If the update() methods determine that the write operation can be executed validly, the Loyalty applet then calls a syncpoint() method, step 104. For each reference in upd_obj_stream, syncpoint() calls a commit() method, step 105, which causes the transaction to be committed to non-volatile smartcard and local terminal storage respectively.

If all commit() methods are successful, the syncpoint() returns true, and for each reference in the upd_obj_stream, syncpoint() calls a destructoro method, step 106. This allows both the local terminal and smartcard to release any resources involved in the transaction, for example, the storage locations of the pre- and post- transaction loyalty points totals.

At step 110, the Loyalty applet then executes a destructor() method from the Base_upd class to remove the appropriate references from the upd_obj_stream.

If any of the commit() methods fail, then for each reference in the upd_obj_stream, the syncpoint() method calls a rollback() method, step 108. Each rollback() method restores the pre-transaction state of the loyalty points total where they have been updated.

Following this step, Loyalty applet program control reverts back to step 106, where resources on the terminal and smartcard are freed as before.

After a commit failure, the syncpoint() method returns a failure to the Loyalty applet. The Applet can then either advise the customer of the problem; or it can retry the transaction operation, by returning to either of steps 102 or 104.

It will be seen that the transaction processing system of the invention is not limited to a transaction involving two pieces of data. In more complicated embodiments of the invention, more than two elements of data may be updated in a transaction, with more than two classes including the update(), commit(), destruct() and rollback() methods being employed.

The extra classes including the above methods may be resident on either the smartcard, the local terminal, or a remote server. For example, where an airline passenger has a smartcard including credit card details and an air miles points total, a single transaction involving the purchase of a flight may involve checking that a) the flight is available, b) funds are available in the credit card account and c) sufficient air miles are available on the smartcard. If, however, when the system goes to commit, the flight becomes unavailable or, due to a communications failure, it is not possible to deduct the appropriate funds from the credit card account—the air miles total on the smartcard will need to be reset to its pre-transaction state.

In this case, both the flight update and credit card update classes may be resident on a remote servers running in respective environments.

In cases where update classes are executed in different environments, communications objects can be exchanged between environments. Thus, in the till program embodiment, the till sends to a remote data server, operating in a different environment, a communications object for all future communications to the till program from the data server, and the data server sends to the till program a communications object for communications from the till to the data server. The communications objects are dynamically installed and loaded in their respective environments and are called upon at transaction execution time.

It will be seen that where data involved in a transaction is stored remotely from the smartcard, communications between the smartcard and the remote server can be via the internet and any suitable network.

What is claimed is:

1. A method of executing a transaction on a smartcard including a processor, a memory for storing a system program, an application program and for storing data and an interface enabling communication with an external processor in a local terminal adapted to access related data, said method comprising the steps of:

determining from the data stored on the smartcard in a pre-transaction state if the transaction can be executed validly by the smartcard and, responsive to a positive determination, storing said pre-transaction state and a post-transaction state of said data;

determining from the related data stored in a pre-transaction state and accessible by said external processor if the transaction can be executed validly by the external processor;

in response to said determining steps being affirmative, executing said transaction on said smartcard and by said external processor; and in response to said smartcard or said external processor failing to execute said transaction, restoring said data and said related data to the or each pre-transaction state and destroying said stored post-transaction state of said data.

2. The method of claim 1 including the steps of:

before said determining steps, creating a stream of references to objects which update data in the transaction, and when said transaction is complete, removing said references from said stream.

3. The method according to claim 1 including the step of, in response to one of said determining steps being negative, instructing said smartcard and said external processor not to execute said transaction.

4. The method according to claim 1 wherein said determining steps are carried out in parallel.

5. The method according to claim 1 wherein the execution of said transaction on said smartcard and by said external processor is carried out in parallel.

6. A smartcard including a processor, a memory for storing a system program, an application program and for storing data and an interface enabling communication with an external processor in a local terminal adapted to access related data, wherein said memory includes means for storing the pre-transaction state of said data and update means adapted to determine if a transaction can be executed validly by the smartcard and, responsive to a positive determination, storing said pre-transaction state and a post-transaction state of said data; said smartcard further including:

commit means to execute said transactions; and rollback means for restoring said data to said pre-transaction state in response to said commit means failing to execute said transaction and destroying said stored post-transaction state of said data.

7. A transaction processing system including a smartcard according to claim 6 inter-operable with a terminal, said terminal including update means adapted to determine if the transaction can be executed validly by the terminal; and commit means to execute said transaction.

8. A transaction processing system according to claim 7 wherein said terminal includes rollback means for restoring said related data to said pre-transaction state in response to either of said commit means failing to execute said transaction.

9. A transaction processing system according to claim 7 wherein said related data is stored in said external unit.

10. A transaction processing system according to claim 7 wherein said related data is stored in a remote server and said terminal is adapted to communicate with said server to determine if said transaction can be executed and to execute said transaction.

11. An article of manufacture comprising a computer usable medium having computer readable program code means embodied therein for executing a transaction on a smartcard of the type including a processor, a memory for storing a system program, an application program and for storing data and an interface enabling communication with an external processor in a local terminal adapted to access related data, the computer readable program code means in said article of manufacture comprising computer readable program code means for causing a computer to effect:

determining from the data stored on the smartcard in a pre-transaction state if the transaction can be executed validly by the smartcard and, responsive to a positive determination, storing said pre-transaction state and a post-transaction state of said data;

determining from the related data stored in a pre-transaction state and accessible by said external processor if the transaction can be executed validly by the external processor;

in response to said determining steps being affirmative, executing said transaction on said smartcard and by said external processor; and in response to said smartcard or said external processor failing to execute said transaction, restoring said data and said related data to the or each pre-transaction state and destroying said stored post-transaction state of said data.

12. An article of manufacture as recited in claim 11, the computer readable program code means in said article of manufacture further comprising computer readable program code means for causing a computer to effect:

before said determining steps, creating a stream of references to objects which update data in the transaction, and when said transaction is complete, removing said references from said stream.

13. An article of manufacture as recited in claim 12, wherein said stream of references includes a reference to an object instantiated from a Java class stored on said smartcard for updating the data stored on the smartcard and a reference to an object for updating the related data accessible by said external processor.

14. An article of manufacture as recited in claim 13, wherein said determining steps are carried out for each reference in the stream, said executing steps are carried out for each reference in the stream and, if necessary, said restoring steps are carried out for each reference in the stream.

15. An article of manufacture as recited in claim 11, the computer readable program code means in said article of manufacture further comprising computer readable program code means for causing a computer to effect in response to one of said determining steps being negative, instructing said smartcard and said external processor not to execute said transaction.

16. An article of manufacture as recited in claim 11, wherein said determining steps are carried out in parallel.

17. An article of manufacture as recited in claim 11, wherein the execution of said transaction on said smartcard and by said external processor is carried out in parallel.

18. A program storage device readable by machine, tangibly embodying a program of instructions executable by the machine to perform method steps for executing a transaction on a smartcard including a processor, a memory for storing a system program, an application program and for storing data and an interface enabling communication with an external processor in a local terminal adapted to access related data, said method steps comprising:

determining from the data stored on the smartcard in a pre-transaction state if the transaction can be executed validly by the smartcard and, responsive to a positive determination, storing said pre-transaction state and a post-transaction state of said data;

determining from the related data stored in a pre-transaction state and accessible by said external processor if the transaction can be executed validly by the external processor;

in response to said determining steps being affirmative, executing said transaction on said smartcard and by said external processor; and in response to said smartcard or said external processor failing to execute said transaction, restoring said data and said related data to the or each pre-transaction state and destroying said stored post-transaction state of said data.

19. A program storage device readable by machine as recited in claim 18, the method steps including the steps of:

before said determining steps, creating a stream of references to objects which update data in the transaction, when said transaction is complete, and removing said references from said stream.

20. A method of executing a transaction on a smartcard including a processor, a memory for storing data, a system program and an application program and, an interface enabling communication with an external processor in a local terminal adapted to access related data, said method comprising the steps of:

creating a stream of references to objects which update data in the transaction, said stream of references including a reference to an object stored on said smartcard for updating data stored on the smartcard and a reference to an object for updating related data accessible by said external processor;

determining from data stored on the smartcard in a pre-transaction state if the transaction can be executed validly by the smartcard and, responsive to a positive determination, storing said pre-transaction state and a post-transaction state of said data;

determining from related data stored in a pre-transaction state and accessible by said external processor if the transaction can be executed validly by the external processor;

in response to said determining steps being affirmative, executing said transaction on said smartcard and by said external processor and then removing said references from said stream; and in response to said smartcard or said external processor failing to execute said transaction, restoring said data and said related data to a corresponding pre-transaction state and destroying said stored post-transaction state of said data.

21. The method of claim 20 wherein said determining steps are carried out for each reference in the stream, said executing steps are carried out for each reference in the stream and, if necessary, said restoring steps are carried out for each reference in the stream.

22. The method according to claim 20 comprising the step of instantiating said object from a Java class from an application running on said external processor.

23. The method according to claim 22 wherein a Java Virtual Machine runs on said external processor, said method comprising the step of executing said object instantiated from said Java class within said Java Virtual Machine.

24. The method according to claim 22 wherein a Java Virtual Machine runs on said smartcard, said method comprising the step of executing said object instantiated from said Java class within said Java Virtual Machine.

* * * * *